(12) United States Patent
Lee et al.

(10) Patent No.: US 9,130,454 B2
(45) Date of Patent: Sep. 8, 2015

(54) CONTROL CIRCUIT FOR DYNAMICALLY ADJUSTING OFF TIME OF POWER SWITCH IN POWER CONVERTER

(71) Applicant: Richtek Technology Corporation, Chupei, Hsinchu (TW)

(72) Inventors: Yen-Te Lee, Hsinchu County (TW); Wen-Wei Chen, New Taipei (TW); Wei-Yuan Ting, Hsinchu (TW)

(73) Assignee: RICHTEK TECHNOLOGY CORPORATION, Chupei (TW)

( * ) Notice: Subject to any disclaimer, the term of this patent is extended or adjusted under 35 U.S.C. 154(b) by 71 days.

(21) Appl. No.: 14/206,856

(22) Filed: Mar. 12, 2014

(65) Prior Publication Data
US 2014/0292295 A1 Oct. 2, 2014

(30) Foreign Application Priority Data
Mar. 29, 2013 (TW) .............................. 102111381 A (51) Int. Cl.
*H02M 3/158* (2006.01)
*H02M 3/156* (2006.01)
*H02M 1/00* (2007.01)

(52) U.S. Cl.
CPC ............ *H02M 3/156* (2013.01); *H02M 3/1588* (2013.01); *H02M 2001/0019* (2013.01); *H02M 2001/0032* (2013.01)

(58) Field of Classification Search
CPC ............ H02M 2001/0019; H02M 2001/0025; H02M 3/1563; H02M 3/158; H02M 3/1588; H02M 2003/1566
See application file for complete search history.

(56) References Cited

U.S. PATENT DOCUMENTS

| 8,305,059 B2 * | 11/2012 | Al-Shyoukh | 323/224 |
| 2009/0027021 A1 * | 1/2009 | Dequina | 323/282 |
| 2012/0194162 A1 * | 8/2012 | Lin et al. | 323/304 |
| 2014/0043005 A1 * | 2/2014 | Ide | 323/285 |

* cited by examiner

*Primary Examiner* — Harry Behm
*Assistant Examiner* — Peter Novak
(74) *Attorney, Agent, or Firm* — Birch, Stewart, Kolasch & Birch, LLP (57) ABSTRACT

A control circuit of a power converter includes: a periodical signal generating circuit for generating a first filtered signal, a second filtered signal, and a periodical signal according to a second feedback signal corresponding to an inductor voltage of the power converter; a comparison circuit for comparing the error signal and the periodical signal to generate a comparison signal; a control signal generating circuit for generating a control signal to control power switches of the power converter according to the comparison signal; and a signal adjusting circuit. During a load transient period at which the load of the power converter changes from a relatively light load to a relatively heavy load, when a lower switch of the power converter is turned on, the signal adjusting circuit reduces an output current of the periodical signal generating circuit to increase a loop response of the power converter.

24 Claims, 6 Drawing Sheets

CONTROL CIRCUIT FOR DYNAMICALLY ADJUSTING OFF TIME OF POWER SWITCH IN POWER CONVERTER

CROSS-REFERENCE TO RELATED APPLICATIONS

This application claims the benefit of priority to Patent Application No. 102111381, filed in Taiwan on Mar. 29, 2013; the entirety of which is incorporated herein by reference for all purposes.

BACKGROUND

The disclosure generally relates to a power converter and, more particularly, to a control circuit for dynamically adjusting an off time of a power switch of the power converter.

A power converter is typically employed in various electronic devices to provide an appropriate operating voltage for subsequent-stage circuits. During a load transient period at which a load of the power converter changes from a relatively light load to a relatively heavy load, a undershoot problem is often occurs in an output voltage signal of a conventional power converter due to the sudden increase of the load, thereby causing the power converter to be unable to provide sufficient voltage or current required for the operations of subsequent-stage circuits in time.

One of traditional solutions is to increase the stability of the output voltage signal of the power converter by increasing the capacity of the output capacitor of the power converter. However, the increase of the capacity of the output capacitor would inevitably increase of the overall circuit area and cost of the power converter, and may adversely affect the loop response of the power converter as well.

SUMMARY

An example embodiment of a control circuit of a power converter is disclosed. The power converter comprises an upper switch, a lower switch, and an inductor. The control circuit comprises: a periodical signal generating circuit, configured to operably generate a first filtered signal, a second filtered signal, and a periodical signal according to a second feedback signal corresponding to a voltage at a first terminal of the inductor; a comparison circuit, coupled with the periodical signal generating circuit, configured to operably compare a reference signal with the periodical signal to generate a comparison signal; a control signal generating circuit, coupled with the comparison circuit, configured to operably generate a control signal according to the comparison signal to dynamically adjust an off time of the upper switch; and a signal adjusting circuit, coupled with the periodical signal generating circuit and the comparison circuit; wherein during a load transient period at which a load of the power converter changes from a relatively light load to a relatively heavy load, when the lower switch is turned on, the signal adjusting circuit reduces an output current of the periodical signal generating circuit to accelerate a loop response of the power converter.

Another example embodiment of a control circuit of a power converter is disclosed. The power converter comprises an inductor. The control circuit comprises: an upper switch, wherein a first terminal of the upper switch is utilized for coupling with an input voltage signal of the power converter, and a second terminal of the upper switch is utilized for coupling with a first terminal of the inductor; a lower switch, wherein a first terminal of the lower switch is coupled with the second terminal of the upper switch, and a second terminal of the lower switch is coupled with a fixed-voltage terminal; a periodical signal generating circuit, configured to operably generate a first filtered signal, a second filtered signal, and a periodical signal according to a second feedback signal corresponding to a voltage at the first terminal of the inductor; a comparison circuit, coupled with the periodical signal generating circuit, configured to operably compare a reference signal with the periodical signal to generate a comparison signal; a control signal generating circuit, coupled with the comparison circuit, configured to operably generate a control signal according to the comparison signal to dynamically adjust an off time of the upper switch; and a signal adjusting circuit, coupled with the periodical signal generating circuit and the comparison circuit; wherein during a load transient period at which a load of the power converter changes from a relatively light load to a relatively heavy load, when the lower switch is turned on, the signal adjusting circuit controls the periodical signal generating circuit to reduce an output current of the periodical signal generating circuit to accelerate a loop response of the power converter.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
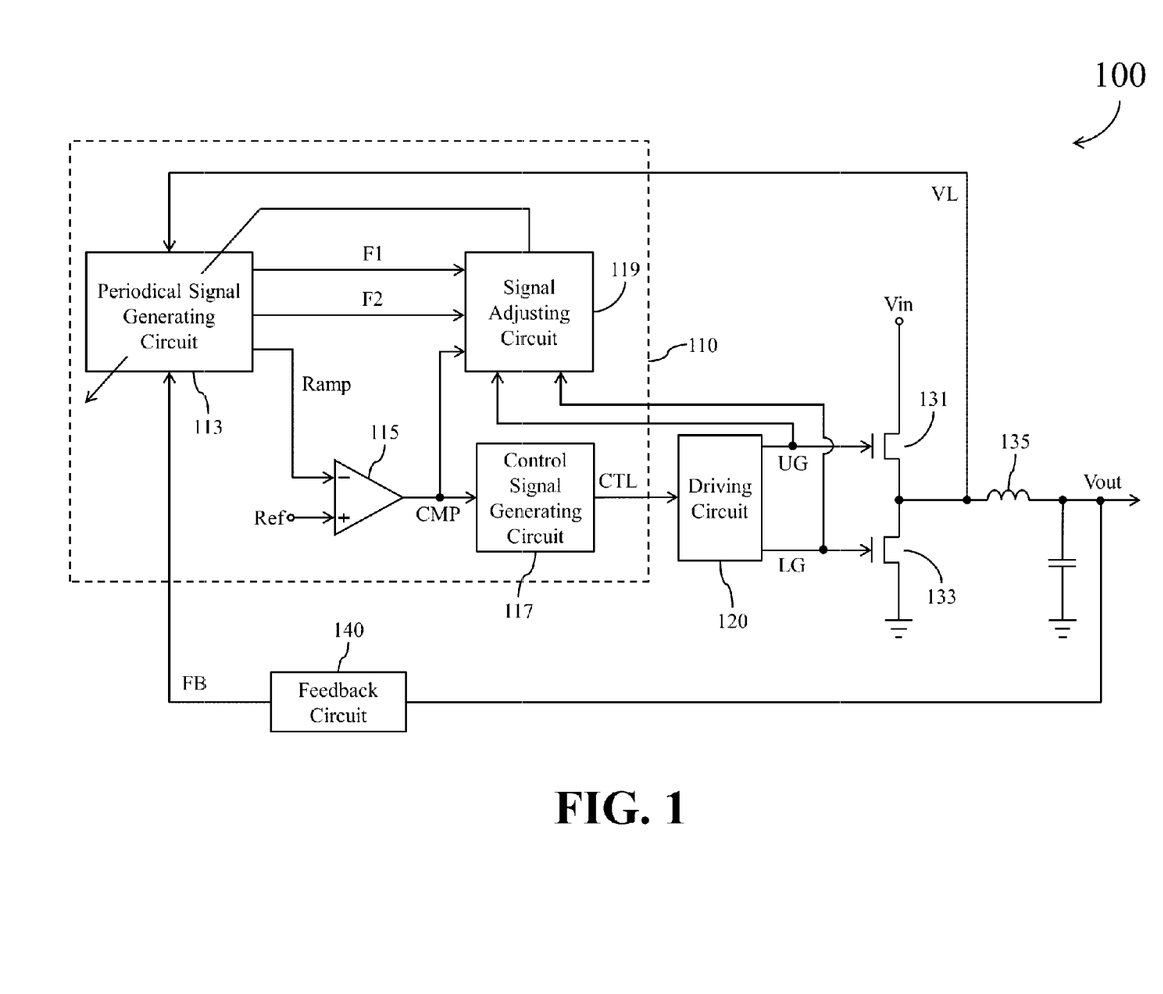
FIG. 1 shows a simplified functional block diagram of a power converter according to one embodiment of the present disclosure.

Please refer to FIG. 1, which shows a simplified functional block diagram of a power converter 100 according to one embodiment of the present disclosure. The power converter 100 comprises a control circuit 110, a driving circuit 120, an upper switch 131, a lower switch 133, an inductor 135, and a feedback circuit 140. As shown in FIG. 1, a first terminal of the upper switch 131 is utilized for coupling with an input voltage signal Vin of the power converter 100, and a second terminal of the upper switch 131 is utilized for coupling with a first terminal of the inductor 135. A first terminal of the lower switch 133 is coupled with the second terminal of the upper switch 131, and a second terminal of the lower switch 133 is coupled with a fixed-voltage terminal (e.g., a grounding terminal). A second terminal of the inductor 135 is coupled with an output terminal of the power converter 100 to provide an output voltage signal Vout.

The driving circuit 120 is configured to operably generate an upper switch signal UG and a lower switch signal LG for controlling the switching operations of the power switches 131 and 133 according to a control signal CTL generated by the control circuit 110. The feedback circuit 140 is coupled with the output terminal of the power converter 100 and is configured to operably generate a first feedback signal FB corresponding to the output voltage signal Vout of the power converter 100.

In practice, the driving circuit 120, the upper switch 131, the lower switch 133, and/or the feedback circuit 140 of the power converter 100 may be respectively realized with circuits outside the control circuit 110, or may be integrated into the control circuit 110. Additionally, the upper switch 131 and the lower switch 133 may be realized with two transistors having the same control logic (e.g., two PMOS transistors or two NMOS transistors). Alternatively, the upper switch 131 and the lower switch 133 may be realized with two transistors having different control logic. For example, one of the upper switch 131 and the lower switch 133 may be realized with a PMOS transistor, and another power switch may be realized with an NMOS transistor.

As shown in FIG. 1, the control circuit 110 in this embodiment comprises a periodical signal generating circuit 113, a comparison circuit 115, a control signal generating circuit 117, and a signal adjusting circuit 119.

When the control circuit 110 is coupled with the power converter 100, the periodical signal generating circuit 113 generates a first filtered signal F1, a second filtered signal F2, and a periodical signal Ramp according to a second feedback signal VL. In this embodiment, the second feedback signal VL corresponds to a voltage at the first terminal of the inductor 135. For example, the second feedback signal VL may be a voltage signal at the first terminal of the inductor 135, a voltage-divided version of the voltage at the first terminal of the inductor 135, or a voltage-reduced version of the voltage at the first terminal of the inductor 135. In practice, the aforementioned periodical signal Ramp may be a triangle wave signal, a sine wave signal, a square wave signal, or a periodical signal of other forms.

The comparison circuit 115 is coupled with the periodical signal generating circuit 113 and is configured to operably compare a reference signal Ref with the periodical signal Ramp to generate a comparison signal CMP. The control signal generating circuit 117 is coupled with the comparison circuit 115 and is configured to operably generate the control signal CTL according to the comparison signal CMP, so as to dynamically adjust an off time of each of the upper switch 131 and the lower switch 133. In practice, the control signal generating circuit 117 may be realized with a PWM signal generator, a PFM signal generator, or various flip flop circuits.

The signal adjusting circuit 119 is coupled with the periodical signal generating circuit 113 and the comparison circuit 115. During a load transient period at which a load of the power converter 100 changes from a relatively light load to a relatively heavy load, the signal adjusting circuit 119 generates an adjustment signal AS1, and utilizes the adjustment signal AS1 to control the periodical signal generating circuit 113 to reduce a difference between the first filtered signal F1 and the second filtered signal F2. Additionally, during the aforementioned load transient period, when the lower switch 133 is turned on, the signal adjusting circuit 119 reduces an output current of the periodical signal generating circuit 113 to accelerate a declining rate of the periodical signal Ramp. As a result, the response speed of the control circuit 110 with respect to the change of load of the power converter 100 can be increased, so as to enable the control circuit 110 to control the driving circuit 120 to turn off the lower switch 133 earlier, and to turn on the upper switch 131 earlier. In other words, the control circuit 110 shortens an on time of the lower switch 133 and shortens the off time of the upper switch 131 to render the upper switch 131 to enter the next conduction cycle earlier to thereby accelerate the energy supply to the output terminal of the power converter 100. In this way, the undershoot problem in the output voltage signal Vout can be effectively avoided.

The operations of the aforementioned periodical signal generating circuit 113 will be further described below by reference to FIG. 2 and FIG. 3.

Figure 2:
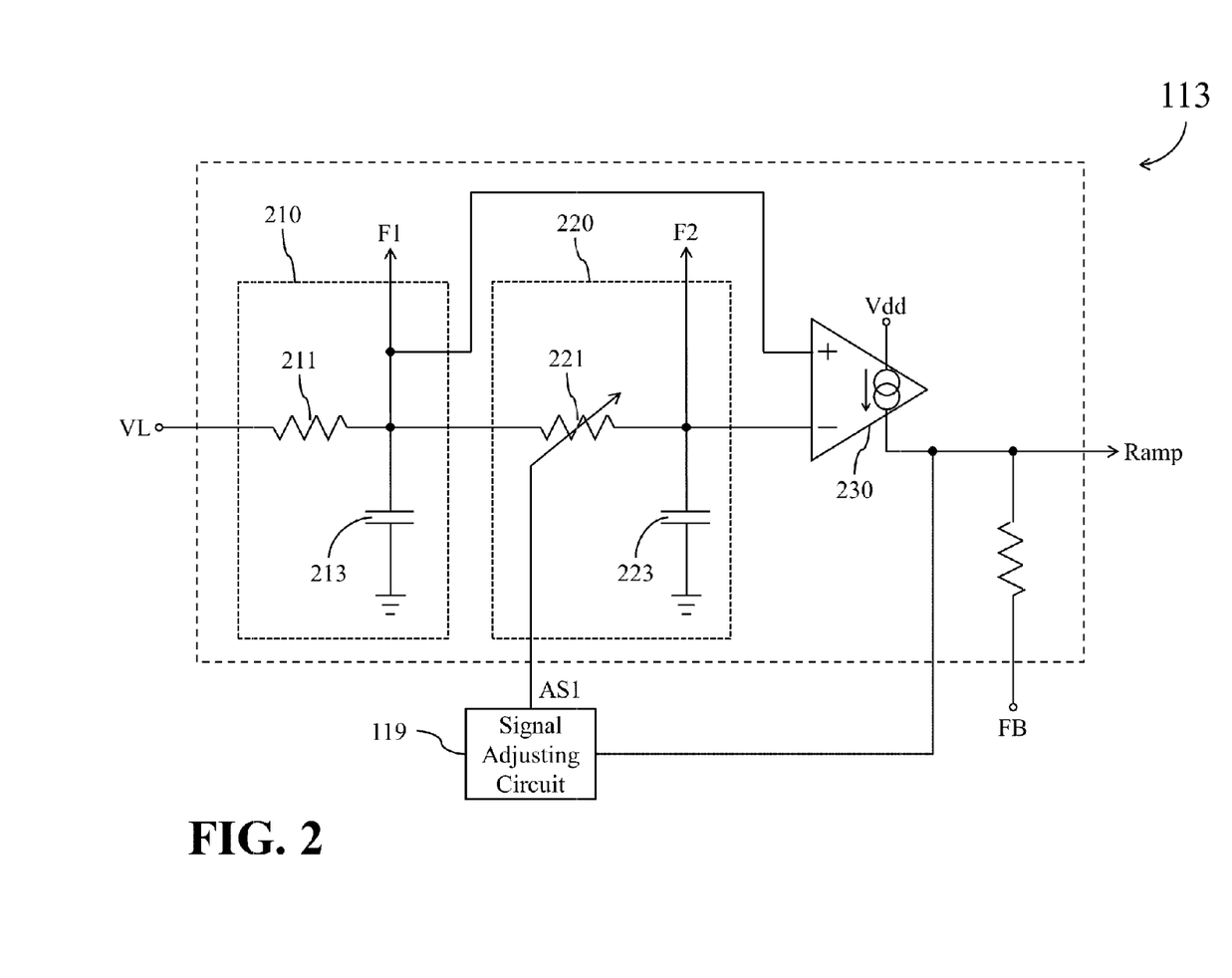
FIGS. 2~3 show simplified functional block diagrams of a periodical signal generating circuit in FIG. 1 according to several embodiments of the present disclosure.

FIG. 2 shows a simplified functional block diagram of the periodical signal generating circuit 113 in FIG. 1 according to one embodiment of the present disclosure. In the embodiment of FIG. 2, the periodical signal generating circuit 113 comprises a first filter 210, a second filter 220, and a first transconductance circuit 230. The first filter 210 is configured to operably generate the first filtered signal F1 according to the second feedback signal VL. The first filter 210 in this embodiment is a resistor-capacitor filter (RC-filter) formed by a resistor 211 and a capacitor 213. In practice, the first filter 210 may be instead realized with other structure.

The second filter 220 is coupled with the first filter 210 and is configured to operably generate the second filtered signal F2 according to the first filtered signal F1. In this embodiment, the second filter 220 is another resistor-capacitor filter formed by a variable resistor device 221 and a capacitor 223. A first terminal of the variable resistor device 221 is coupled with an output terminal of the first filter 210. A first terminal of the capacitor 223 is coupled with a second terminal of the variable resistor device 221 to provide the second filtered signal F2, and a second terminal of the capacitor 223 is coupled with a fixed-voltage terminal (e.g., a grounding terminal). In practice, the second filter 210 may be instead realized with other structures.

The first transconductance circuit 230 is coupled with the first filter 210 and the second filter 220, and is configured to operably generate the corresponding periodical signal Ramp according to the difference between the first filtered signal F1 and the second filtered signal F2.

During the load transient period at which the load of the power converter 100 changes from a relatively light load to a relatively heavy load, the signal adjusting circuit 119 may utilize the adjustment signal AS1 to control the second filter 220 to reduce the difference between the second filtered signal F2 and the first filtered signal F1. For example, in the embodiment of FIG. 2, the signal adjusting circuit 119 may utilize the adjustment signal AS1 to reduce a resistance value of the variable resistor device 221 of the second filter 220, so as to render the second filtered signal F2 to have a waveform more similar to the waveform of the first filtered signal F1. In this situation, the difference between the first filtered signal F1 and the second filtered signal F2 can be reduced, and the periodical signal Ramp generated by the first transconductance circuit 230 can be lowered correspondingly. The decrease of the magnitude of the periodical signal Ramp increases the response speed of the periodical signal generating circuit 113 with respect to the change of load of the power converter 100.

Additionally, during the aforementioned load transient period, when the lower switch 133 is turned on, the signal adjusting circuit 119 draws a portion of the output current of the first transconductance circuit 230 to accelerate the declining rate of the periodical signal Ramp. As a result, the control circuit 110 shortens the on time of the lower switch 133 and the off time of the upper switch 131, so as to make the upper switch 131 to enter the next conduction cycle earlier to accelerate the energy supply to the output terminal of the power converter 100, thereby preventing undershoot in the output voltage signal Vout.

Figure 3:
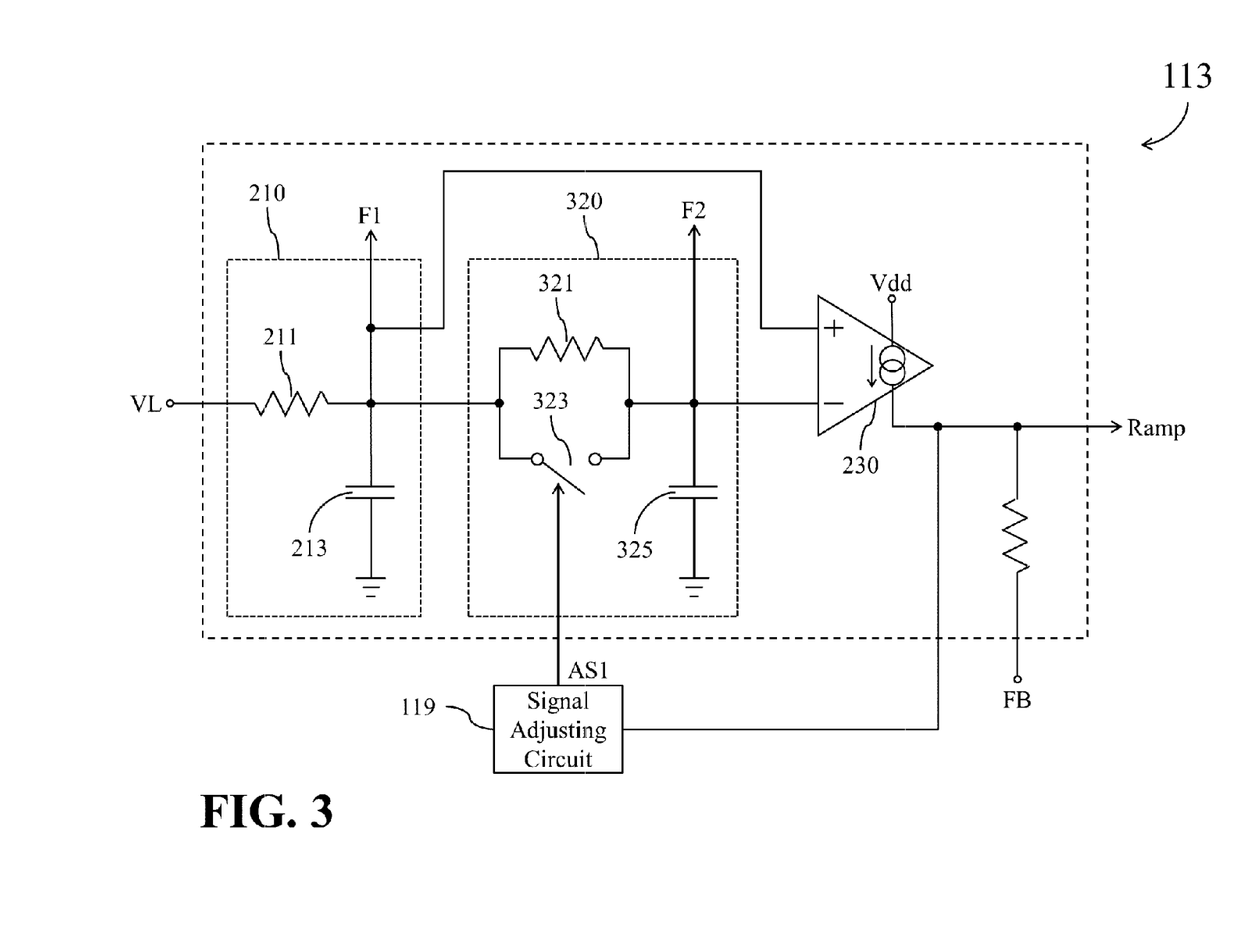

FIG. 3 shows a simplified functional block diagram of the periodical signal generating circuit 113 in FIG. 1 according to another embodiment of the present disclosure.

The embodiment of FIG. 3 is very similar to the embodiment of FIG. 2, and one major difference between the two embodiments is in that the second filter 220 of FIG. 2 is replaced by a second filter 320 in the periodical signal generating circuit 113 of FIG. 3. As shown in FIG. 3, the second filter 320 is coupled with the first filter 210 and is configured to operably generate the second filtered signal F2 according to the first filtered signal F1. In this embodiment, the second filter 320 is another resistor-capacitor filter formed by a resistor 321, a switch 323, and a capacitor 325.

A first terminal of the resistor 321 is coupled with the output terminal of the first filter 210. The switch 323 is coupled between the first terminal of the resistor 321 and a second terminal of the resistor 321, and a control terminal of the switch 323 is coupled with the signal adjusting circuit 119. A first terminal of the capacitor 325 is coupled with the second terminal of the resistor 321 to provide the second filtered signal F2, and a second terminal of the capacitor 325 is coupled with a fixed-voltage terminal (e.g., a grounding terminal).

During the load transient period at which the load of the power converter 100 changes from a relatively light load to a relatively heavy load, the signal adjusting circuit 119 may utilize the adjustment signal AS1 to control the second filter 320 to reduce the difference between the second filtered signal F2 and the first filtered signal F1. For example, in the embodiment of FIG. 3, the signal adjusting circuit 119 may utilize the adjustment signal AS1 to turn on the switch 323 of the second filter 320 to reduce an equivalent resistance value of the second filter 320, so as to render the second filtered signal F2 to have a wave form more similar to the waveform of the first filtered signal F1. In this situation, the difference between the first filtered signal F1 and the second filtered signal F2 can be reduced, and the periodical signal Ramp generated by the first transconductance circuit 230 can be lowered correspondingly, thereby increasing the response speed of the periodical signal generating circuit 113 with respect to the change of load of the power converter 100.

Additionally, during the aforementioned load transient period, when the lower switch 133 is turned on, the signal adjusting circuit 119 draws a portion of the output current of the first transconductance circuit 230 to accelerate the declining rate of the periodical signal Ramp. As a result, the control circuit 110 shortens the on time of the lower switch 133 and the off time of the upper switch 131, so as to render the upper switch 131 to enter the next conduction cycle earlier to accelerate the energy supply to the output terminal of the power converter 100, thereby preventing undershoot in the output voltage signal Vout.

The operations of the aforementioned signal adjusting circuit 119 will be further described below by reference to FIGS. 4~6.

Figure 4:
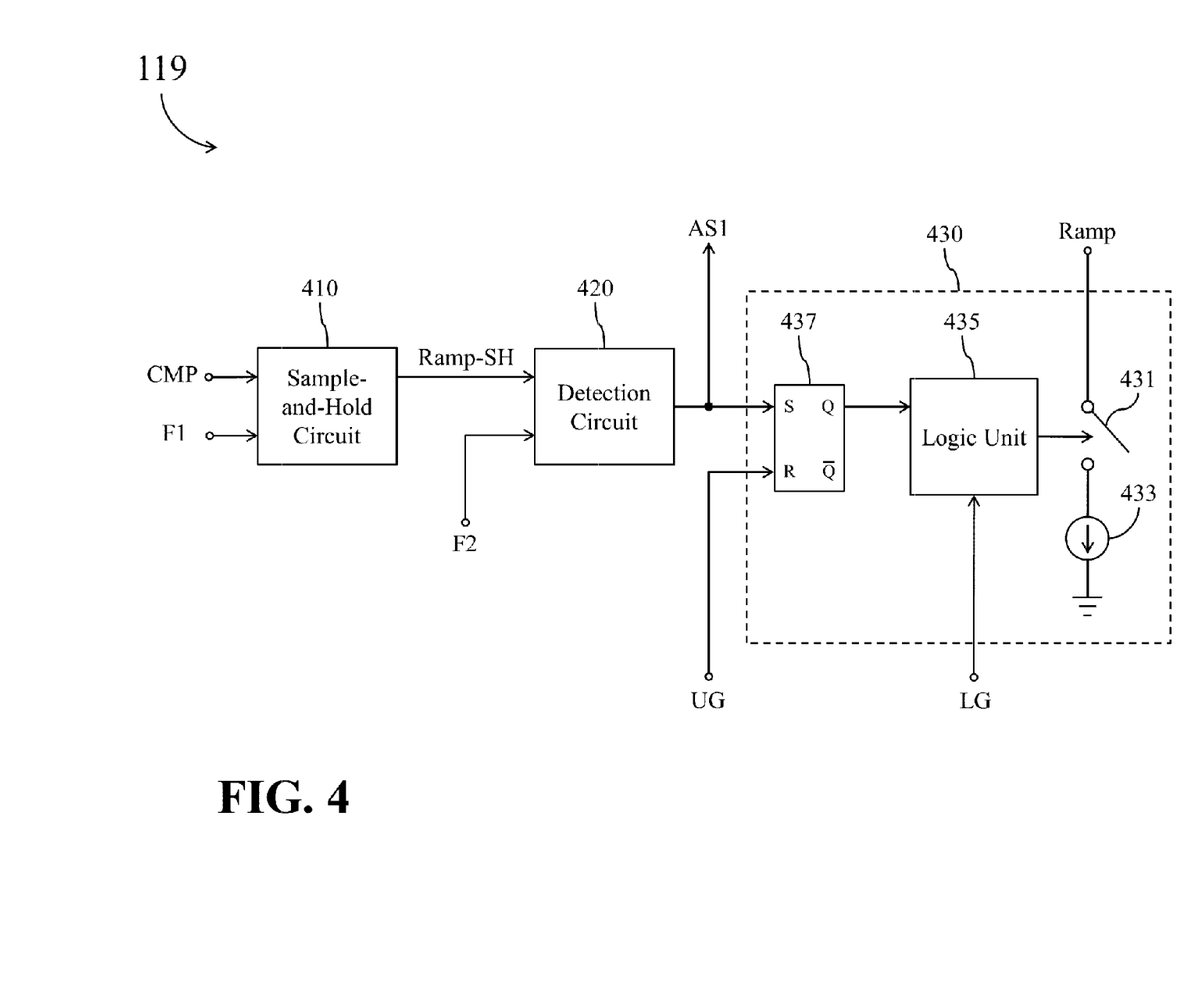
FIGS. 4~6 show simplified functional block diagrams of a signal adjusting circuit in FIG. 1 according to several embodiments of the present disclosure.

FIG. 4 shows a simplified functional block diagram of the signal adjusting circuit 119 in FIG. 1 according to one embodiment of the present disclosure. In the embodiment of FIG. 4, the signal adjusting circuit 119 comprises a sample-and-hold circuit 410, a detection circuit 420, and a current adjusting circuit 430. The sample-and-hold circuit 410 is coupled with the periodical signal generating circuit 113 and the comparison circuit 115, and is configured to operably generate a sample-and-hold signal Ramp-SH according to the first filtered signal F1 and the comparison signal CMP. In this embodiment, when the sample-and-hold circuit 410 is triggered by the comparison signal CMP, the sample-and-hold circuit 410 samples the first filtered signal F1 to generate the sample-and-hold signal Ramp-SH.

The detection circuit 420 is coupled with the sample-and-hold circuit 410 and the periodical signal generating circuit 113, and is configured to operably generate the adjustment signal AS1 according to the second filtered signal F2 and the sample-and-hold signal Ramp-SH. In one embodiment, when the sample-and-hold signal Ramp-SH is greater than the second filtered signal F2, the detection circuit 420 determines that the power converter 100 is experiencing a load transient from a relatively light load to a relatively heavy load. Accordingly, the detection circuit 420 configures the adjustment signal AS1 to an active level, and utilizes the adjustment signal AS1 to control the second filter 220 or 320 of the periodical signal generating circuit 113 to reduce the difference between the second filtered signal F2 and the first filtered signal F1. As can be appreciated from the foregoing descriptions, the detection circuit 420 is enabled to indirectly determine the situation of the load change of the power converter 100 through the first filtered signal F1 and the second filtered signal F2 generated by the periodical signal generating circuit 113.

The current adjusting circuit 430 is coupled with the detection circuit 420 and the periodical signal generating circuit 113. When the lower switch 133 is turned on, the current adjusting circuit 430 reduces the output current of the periodical signal generating circuit 113 according to the adjustment signal AS1 to accelerate the declining rate of the periodical signal Ramp. In practice, the current adjusting circuit 430 may determine whether the lower switch 133 is in an on status or in an off status according to the lower switch signal LG.

As shown in FIG. 4, the current adjusting circuit 430 comprises a switch 431, a current sink 433, a logic unit 435, and a flip flop 437. A first terminal of the switch 431 is coupled with an output terminal of the periodical signal generating circuit 113 (e.g., an output terminal of the aforementioned first transconductance circuit 230). The current sink 433 is coupled with a second terminal of the switch 431. The logic unit 435 is coupled with a control terminal of the switch 431 for controlling the operations of the switch 431. The flip flop 437 is coupled between an output terminal of the detection circuit 420 and an input terminal of the logic unit 435. In this embodiment, the logic unit 435 determines whether the lower switch 133 is turned on according to the lower switch signal LG, and the logic unit 435 turns on the switch 431 only if the lower switch 133 is turned on. Accordingly, the lower switch signal LG can be equivalently regarded as an enable signal of the logic unit 435.

In the current adjusting circuit 430, the flip flop 437 utilizes the upper switch signal UG as a reset signal, and when the upper switch 131 is turned on, the upper switch signal UG resets the flip flop 437.

As can be appreciated from the foregoing descriptions, during the load transient period at which the load of the power converter 100 changes from a relatively light load to a relatively heavy load, the flip flop 437 controls the logic unit 435 to turn on the switch 431 according to the adjustment signal AS1 only if the upper switch 131 is turn off while the lower switch 133 is turned on, so that the current sink 433 draws the output current of the periodical signal generating circuit 113 (e.g., draws a portion of the output current of the first transconductance circuit 230) to accelerate the declining rate of the periodical signal Ramp. As a result, the current adjusting circuit 430 can be effectively prevented from conducting erroneous operations when the upper switch 131 is turned on.

Figure 5:
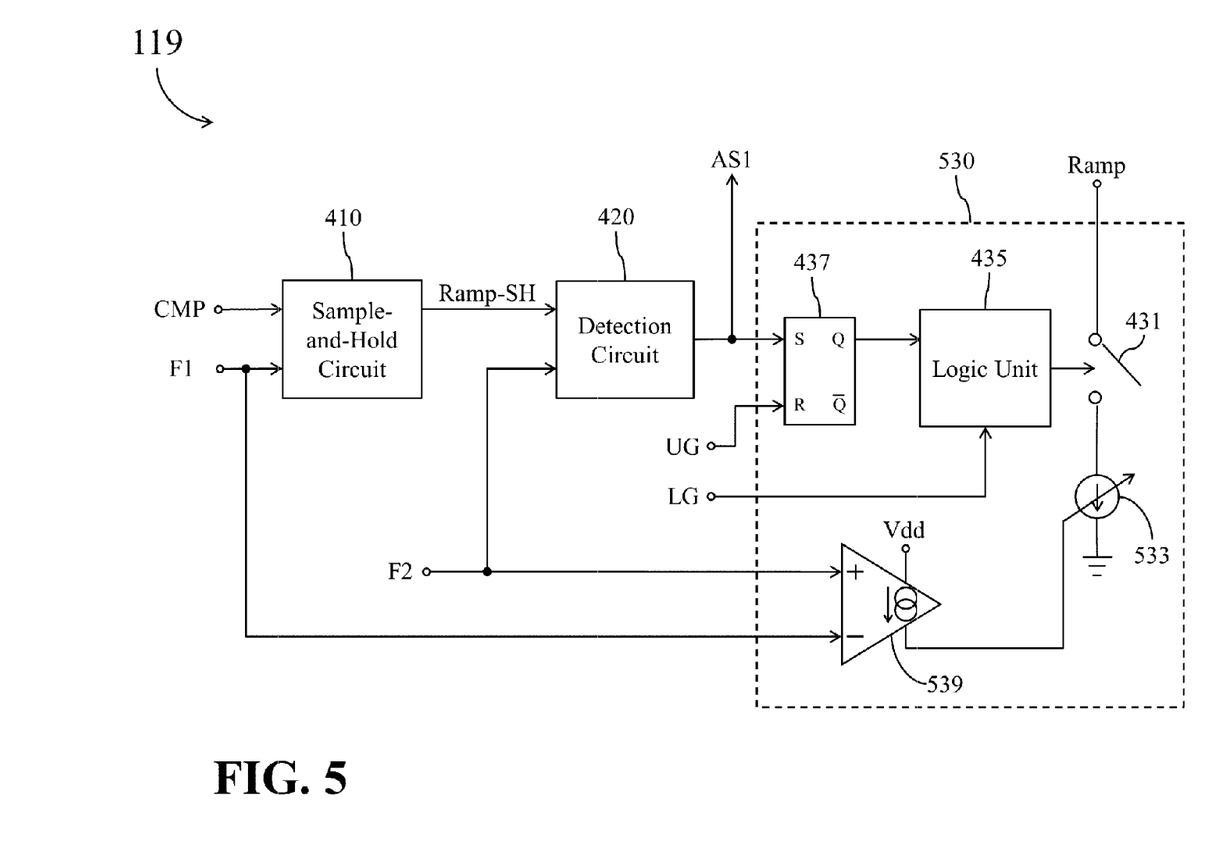

FIG. 5 shows a simplified functional block diagram of the signal adjusting circuit 119 in FIG. 1 according to another embodiment of the present disclosure. In the embodiment of FIG. 5, the signal adjusting circuit 119 comprises the sample-and-hold circuit 410, the detection circuit 420, and a current adjusting circuit 530. The sample-and-hold circuit 410 and the detection circuit 420 of FIG. 5 are identical to the corresponding components in the embodiment of FIG. 4. Accordingly, the descriptions regarding the implementations and the operations of the sample-and-hold circuit 410 and the detection circuit 420 of FIG. 4 are also applicable to the embodiment of FIG. 5.

The current adjusting circuit 530 in FIG. 5 is coupled with the detection circuit 420 and the periodical signal generating circuit 113. When the lower switch 133 is turned on, the current adjusting circuit 530 reduces the output current of the periodical signal generating circuit 113 according to the adjustment signal AS1, so as to accelerate the declining rate of the periodical signal Ramp. In practice, the current adjusting circuit 530 may determine whether the lower switch 133 is in an on status or in an off status according to the lower switch signal LG.

As shown in FIG. 5, the current adjusting circuit 530 comprises the switch 431, a current sink 533, the logic unit 435, the flip flop 437, and a second transconductance circuit 539. In the current adjusting circuit 530, the switch 431, the logic unit 435, and the flip flop 437 are identical to the corresponding components in the embodiment of FIG. 4. Accordingly, the descriptions regarding the related connections and operations of the switch 431, the logic unit 435, and the flip flop 437 of FIG. 4 are also applicable to the embodiment of FIG. 5.

In the current adjusting circuit 530, the current sink 533 is coupled with the second terminal of the switch 431. The second transconductance circuit 539 is coupled with a control terminal of the current sink 533 and the periodical signal generating circuit 113, and is configured to operably generate a difference signal according to the difference between the first filtered signal F1 and the second filtered signal F2.

Accordingly, during the load transient period at which the load of the power converter 100 changes from a relatively light load to a relatively heavy load, the flip flop 437 controls the logic unit 435 to turn on the switch 431 according to the adjustment signal AS1 only if the upper switch 131 is turn off while the lower switch 133 is turned on, so that the current sink 533 draws the output current of the periodical signal generating circuit 113 (e.g., draws a portion of the output current of the first transconductance circuit 230) according to the difference signal to accelerate the declining rate of the periodical signal Ramp. As a result, the current adjusting circuit 530 can be effectively prevented from conducting erroneous operations when the upper switch 131 is turned on.

Figure 6:
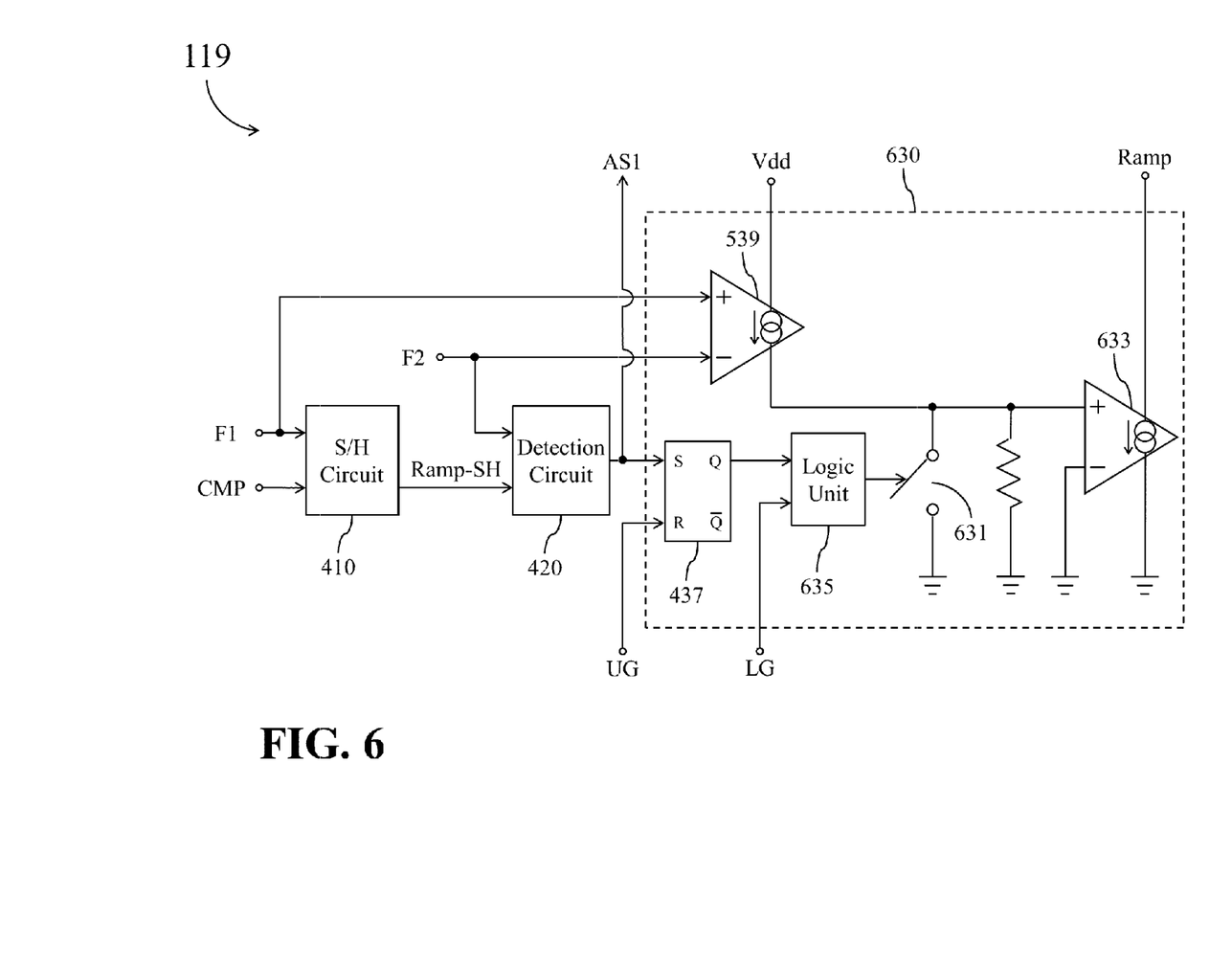

FIG. 6 shows a simplified functional block diagram of the signal adjusting circuit 119 in FIG. 1 according to another embodiment of the present disclosure. In the embodiment of FIG. 6, the signal adjusting circuit 119 comprises the sample-and-hold circuit 410, the detection circuit 420, and a current adjusting circuit 630. The sample-and-hold circuit 410 and the detection circuit 420 of FIG. 6 are identical to the corresponding components in the embodiment of FIG. 4. Accordingly, the descriptions regarding the implementations and the operations of the sample-and-hold circuit 410 and the detection circuit 420 of FIG. 4 are also applicable to the embodiment of FIG. 6.

The current adjusting circuit 630 of FIG. 6 is coupled with the detection circuit 420 and the periodical signal generating circuit 113. When the lower switch 133 is turned on, the current adjusting circuit 630 reduces the output current of the periodical signal generating circuit 113 according to the adjustment signal AS1, so as to accelerate the declining rate of the periodical signal Ramp. In practice, the current adjusting circuit 630 may determine whether the lower switch 133 is in an on status or in an off status according to the lower switch signal LG.

As shown in FIG. 6, the current adjusting circuit 630 comprises a switch 631, the second transconductance circuit 539, a third transconductance circuit 633, a logic unit 635, and the flip flop 437. The second transconductance circuit 539 is coupled with the periodical signal generating circuit 113 and is configured to operably generate a difference signal according to the difference between the first filtered signal F1 and the second filtered signal F2. The third transconductance circuit 633 is coupled with the periodical signal generating circuit 113 and the second transconductance circuit 539. A first terminal of the switch 631 is coupled with an input terminal of the third transconductance circuit 633, and a second terminal of the switch 631 is coupled with a fixed-voltage terminal (e.g., a grounding terminal). The logic unit 635 is coupled with a control terminal of the switch 631. The flip flop 437 is coupled between the output terminal of the detection circuit 420 and an input terminal of the logic unit 635. In this embodiment, the logic unit 635 determines whether the lower switch 133 is turned on according to the lower switch signal LG, and the logic unit 635 turns off the switch 631 only if the lower switch 133 is turned on. Accordingly, the lower switch signal LG can be equivalently regarded as an enable signal of the logic unit 635.

In the current adjusting circuit 630, the flip flop 437 utilizes the upper switch signal UG as a reset signal, and when the upper switch 131 is turned on, the upper switch signal UG resets the flip flop 437.

Accordingly, during the load transient period at which the load of the power converter 100 changes from a relatively light load to a relatively heavy load, the flip flop 437 controls the logic unit 635 to turn off the switch 631 according to the adjustment signal AS1 only if the upper switch 131 is turn off while the lower switch 133 is turned on, so that the third transconductance circuit 633 draws the output current of the periodical signal generating circuit 113 (e.g., draws a portion of the output current of the first transconductance circuit 230) to accelerate the declining rate of the periodical signal Ramp. As a result, the current adjusting circuit 630 can be effectively prevented from conducting erroneous operations when the upper switch 131 is turned on.

In each of the aforementioned embodiments, the signal adjusting circuit 119 is enabled to indirectly determine the situation of the load change of the power converter 100 through the first filtered signal F1 and the second filtered signal F2 generated by the periodical signal generating circuit 113. During the load transient period at which the load of the power converter 100 changes from a relatively light load to a relatively heavy load, the signal adjusting circuit 119 utilizes the adjustment signal AS1 to control the periodical signal generating circuit 113 to reduce the difference between the first filtered signal F1 and the second filtered signal F2, so as to increase the response speed of the control circuit 110 with respect to the change of load of the power converter 100. Additionally, during the aforementioned load transient period, when the upper switch 131 is turn off and the lower switch 133 is turned on, the signal adjusting circuit 119 also draws a portion of the output current of the periodical signal generating circuit 113 to reduce the output current of the periodical signal generating circuit 113 to thereby accelerate the declining rate of the periodical signal Ramp. As a result, a loop response of the power converter 100 can be accelerated so that the control circuit 110 shortens the on time of the lower switch 133 and the off time of the upper switch 131 to render the upper switch 131 to enter the next conduction cycle earlier to accelerate the energy supply to the output terminal of the power converter 100, thereby preventing undershoot in the output voltage signal Vout.

In the aforementioned embodiment of FIG. 4, the flip flop 437 of the current adjusting circuit 430 may be omitted and the logic unit 435 may be directly coupled with the output terminal of the detection circuit 420, so as to simplify the structure of the current adjusting circuit 430. In this situation, during the aforementioned load transient period, when the lower switch 133 is turned on, the logic unit 435 turns on the switch 431 according to the adjustment signal AS1 so that the current sink 433 draws the output current of the periodical signal generating circuit 113.

In the aforementioned embodiment of FIG. 5, the flip flop 437 of the current adjusting circuit 530 may be omitted and the logic unit 435 may be directly coupled with the output terminal of the detection circuit 420, so as to simplify the structure of the current adjusting circuit 530. In this situation, during the aforementioned load transient period, when the lower switch 133 is turned on, the logic unit 435 turns on the switch 431 according to the adjustment signal AS1 so that the current sink 533 draws the output current of the periodical signal generating circuit 113 according to the difference signal.

In the aforementioned embodiment of FIG. 6, the flip flop 437 of the current adjusting circuit 630 may be omitted and the logic unit 635 may be directly coupled with the output terminal of the detection circuit 420, so as to simplify the structure of the current adjusting circuit 630. In this situation, during the aforementioned load transient period, when the lower switch 133 is turned on, the logic unit 635 turns off the switch 431 according to the adjustment signal AS1 so that the third transconductance circuit 633 draws the output current of the periodical signal generating circuit 113 according to the difference signal.

As can be appreciated from the foregoing descriptions, during the load transient period at which the load of the power converter 100 changes from a relatively light load to a relatively heavy load, the signal adjusting circuit 119 reduces the output current of the periodical signal generating circuit 113 to accelerate the declining rate of the periodical signal Ramp. As a result, the loop response of the power converter 100 can be accelerated so that the control circuit 110 shortens the on time of the lower switch 133 and the off time of the upper switch 131 to render the upper switch 131 to enter the next conduction cycle earlier to accelerate the energy supply to the output terminal of the power converter 100, thereby preventing undershoot in the output voltage signal Vout.

Accordingly, with the cooperation of the periodical signal generating circuit 113 and the signal adjusting circuit 119, the stability of the output voltage signal Vout of the power converter 100 can be effectively improved, and the response speed of the control circuit 110 with respect to the change of load of the power converter 100 can be effectively increased without increasing the capacity of the output capacitor of the power converter 100. The disclosed structure improves the overall operating performance of the power converter 100 without causing adverse effect to the loop response of the power converter 100.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

The term "voltage signal" used throughout the description and the claims may be expressed in the format of a current in implementations, and the term "current signal" used throughout the description and the claims may be expressed in the format of a voltage in implementations.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit of a power converter, the power converter comprising an upper switch, a lower switch, and an inductor, the control circuit comprising:
   a periodical signal generating circuit, configured to operably generate a first filtered signal, a second filtered signal, and a periodical signal according to a second feedback signal corresponding to a voltage at a first terminal of the inductor;
   a comparison circuit, coupled with the periodical signal generating circuit, configured to operably compare a reference signal with the periodical signal to generate a comparison signal;
   a control signal generating circuit, coupled with the comparison circuit, configured to operably generate a control signal according to the comparison signal to dynamically adjust an off time of the upper switch; and
   a signal adjusting circuit, coupled with the periodical signal generating circuit and the comparison circuit;
   wherein during a load transient period at which a load of the power converter changes from a relatively light load to a relatively heavy load, when the lower switch is turned on, the signal adjusting circuit reduces an output current of the periodical signal generating circuit to accelerate a loop response of the power converter.

2. The control circuit of claim 1, wherein the periodical signal generating circuit comprises:
   a first filter, configured to operably generate the first filtered signal according to the second feedback signal;
   a second filter, coupled with the first filter, configured to operably generate the second filtered signal according to the first filtered signal; and
   a first transconductance circuit, coupled with the first filter and the second filter, configured to operably generate the periodical signal according to a difference between the first filtered signal and the second filtered signal.

3. The control circuit of claim 2, wherein the second filter comprises:

a variable resistor device, wherein a first terminal of the variable resistor device is coupled with an output terminal of the first filter; and a first capacitor, wherein a first terminal of the first capacitor is coupled with a second terminal of the variable resistor device to provide the second filtered signal, and a second terminal of the first capacitor is coupled with a fixed-voltage terminal;

wherein during the load transient period, the signal adjusting circuit reduces a resistance value of the variable resistor device to reduce the difference between the second filtered signal and the first filtered signal.

4. The control circuit of claim 2, wherein the second filter comprises:

a first resistor, wherein a first terminal of the first resistor is coupled with an output terminal of the first filter;

a first switch, coupled between the first terminal of the first resistor and a second terminal of the first resistor, wherein a control terminal of the first switch is coupled with the signal adjusting circuit; and a first capacitor, wherein a first terminal of the first capacitor is coupled with the second terminal of the first resistor to provide the second filtered signal, and a second terminal of the first capacitor is coupled with a fixed-voltage terminal;

wherein during the load transient period, the signal adjusting circuit turns on the first switch to reduce the difference between the second filtered signal and the first filtered signal.

5. The control circuit of claim 2, wherein the signal adjusting circuit comprises:

a sample-and-hold circuit, coupled with the periodical signal generating circuit and the comparison circuit, configured to operably generate a sample-and-hold signal according to the first filtered signal and the comparison signal;

a detection circuit, coupled with the sample-and-hold circuit and the periodical signal generating circuit, configured to operably generate an adjustment signal according to the second filtered signal and the sample-and-hold signal, and to operably utilize the adjustment signal to control the second filter to reduce the difference between the second filtered signal and the first filtered signal; and a current adjusting circuit, coupled with the detection circuit and the periodical signal generating circuit;

wherein when the lower switch is turned on, the current adjusting circuit reduces the output current of the periodical signal generating circuit according to the adjustment signal to accelerate a declining rate of the periodical signal.

6. The control circuit of claim 5, wherein the current adjusting circuit comprises:

a second switch, wherein a first terminal of the second switch is coupled with an output terminal of the periodical signal generating circuit;

a current sink, coupled with a second terminal of the second switch; and a logic unit, coupled with an output terminal of the detection circuit and a control terminal of the second switch;

wherein when the lower switch is turned on, the logic unit turns on the second switch according to the adjustment signal, so that the current sink draws the output current of the periodical signal generating circuit to accelerate the declining rate of the periodical signal.

7. The control circuit of claim 5, wherein the current adjusting circuit comprises:

a second switch, wherein a first terminal of the second switch is coupled with an output terminal of the periodical signal generating circuit;

a current sink, coupled with a second terminal of the second switch;

a logic unit, coupled with an output terminal of the detection circuit and a control terminal of the second switch; and a second transconductance circuit, coupled with a control terminal of the current sink and the periodical signal generating circuit, configured to operably generate a difference signal according to the difference between the first filtered signal and the second filtered signal;

wherein when the lower switch is turned on, the logic unit turns on the second switch according to the adjustment signal, so that the current sink draws the output current of the periodical signal generating circuit according to the difference signal to accelerate the declining rate of the periodical signal.

8. The control circuit of claim 5, wherein the current adjusting circuit comprises:

a second transconductance circuit, coupled with the periodical signal generating circuit, configured to operably generate a difference signal according to the difference between the first filtered signal and the second filtered signal;

a third transconductance circuit, coupled with the periodical signal generating circuit and the second transconductance circuit;

a third switch, wherein a first terminal of the third switch is coupled with an input terminal of the third transconductance circuit, and a second terminal of the third switch is coupled with a fixed-voltage terminal; and a logic unit, coupled with an output terminal of the detection circuit and a control terminal of the third switch;

wherein when the lower switch is turned on, the logic unit turns off the third switch according to the adjustment signal, so that the third transconductance circuit draws the output current of the periodical signal generating circuit according to the difference signal to accelerate the declining rate of the periodical signal.

9. The control circuit of claim 5, wherein the current adjusting circuit reduces the output current of the periodical signal generating circuit according to the adjustment signal only if the lower switch is turned on while the upper switch is turned off.

10. The control circuit of claim 9, wherein the current adjusting circuit comprises:

a second switch, wherein a first terminal of the second switch is coupled with an output terminal of the periodical signal generating circuit;

a current sink, coupled with a second terminal of the second switch;

a logic unit, coupled with a control terminal of the second switch; and a flip flop, coupled between an output terminal of the detection circuit and an input terminal of the logic unit;

wherein when the upper switch is turned off and the lower switch is turned on, the flip flop controls the logic unit to turn on the second switch according to the adjustment signal, so that the current sink draws the output current of the periodical signal generating circuit to accelerate the declining rate of the periodical signal.

11. The control circuit of claim 9, wherein the current adjusting circuit comprises:

a second switch, wherein a first terminal of the second switch is coupled with an output terminal of the periodical signal generating circuit;

a current sink, coupled with a second terminal of the second switch;

a logic unit, coupled with a control terminal of the second switch;

a flip flop, coupled between an output terminal of the detection circuit and an input terminal of the logic unit; and a second transconductance circuit, coupled with a control terminal of the current sink and the periodical signal generating circuit, configured to operably generate a difference signal according to the difference between the first filtered signal and the second filtered signal;

wherein when the upper switch is turned off and the lower switch is turned on, the flip flop controls the logic unit to turn on the second switch according to the adjustment signal, so that the current sink draws the output current of the periodical signal generating circuit according to the difference signal to accelerate the declining rate of the periodical signal.

12. The control circuit of claim 9, wherein the current adjusting circuit comprises:

a second transconductance circuit, coupled with the periodical signal generating circuit, configured to operably generate a difference signal according to the difference between the first filtered signal and the second filtered signal;

a third transconductance circuit, coupled with the periodical signal generating circuit and the second transconductance circuit;

a third switch, wherein a first terminal of the third switch is coupled with an input terminal of the third transconductance circuit, and a second terminal of the third switch is coupled with a fixed-voltage terminal;

a logic unit, coupled with a control terminal of the third switch; and a flip flop, coupled between an output terminal of the detection circuit and an input terminal of the logic unit;

wherein when the upper switch is turned off and the lower switch is turned on, the flip flop controls the logic unit to turn off the third switch according to the adjustment signal, so that the third transconductance circuit draws the output current of the periodical signal generating circuit according to the difference signal to accelerate the declining rate of the periodical signal.

13. A control circuit of a power converter, the power converter comprising an inductor, the control circuit comprising:

an upper switch, wherein a first terminal of the upper switch is utilized for coupling with an input voltage signal of the power converter, and a second terminal of the upper switch is utilized for coupling with a first terminal of the inductor;

a lower switch, wherein a first terminal of the lower switch is coupled with the second terminal of the upper switch, and a second terminal of the lower switch is coupled with a fixed-voltage terminal;

a periodical signal generating circuit, configured to operably generate a first filtered signal, a second filtered signal, and a periodical signal according to a second feedback signal corresponding to a voltage at the first terminal of the inductor;

a comparison circuit, coupled with the periodical signal generating circuit, configured to operably compare a reference signal with the periodical signal to generate a comparison signal;

a control signal generating circuit, coupled with the comparison circuit, configured to operably generate a control signal according to the comparison signal to dynamically adjust an off time of the upper switch; and a signal adjusting circuit, coupled with the periodical signal generating circuit and the comparison circuit;

wherein during a load transient period at which a load of the power converter changes from a relatively light load to a relatively heavy load, when the lower switch is turned on, the signal adjusting circuit controls the periodical signal generating circuit to reduce an output current of the periodical signal generating circuit to accelerate a loop response of the power converter.

14. The control circuit of claim 13, wherein the periodical signal generating circuit comprises:

a first filter, configured to operably generate the first filtered signal according to the second feedback signal;

a second filter, coupled with the first filter, configured to operably generate the second filtered signal according to the first filtered signal; and a first transconductance circuit, coupled with the first filter and the second filter, configured to operably generate the periodical signal according to a difference between the first filtered signal and the second filtered signal.

15. The control circuit of claim 14, wherein the second filter comprises:

a variable resistor device, wherein a first terminal of the variable resistor device is coupled with an output terminal of the first filter; and a first capacitor, wherein a first terminal of the first capacitor is coupled with a second terminal of the variable resistor device to provide the second filtered signal, and a second terminal of the first capacitor is coupled with a fixed-voltage terminal;

wherein during the load transient period, the signal adjusting circuit reduces a resistance value of the variable resistor device to reduce the difference between the second filtered signal and the first filtered signal.

16. The control circuit of claim 14, wherein the second filter comprises:

a first resistor, wherein a first terminal of the first resistor is coupled with an output terminal of the first filter;

a first switch, coupled between the first terminal of the first resistor and a second terminal of the first resistor, wherein a control terminal of the first switch is coupled with the signal adjusting circuit; and a first capacitor, wherein a first terminal of the first capacitor is coupled with the second terminal of the first resistor to provide the second filtered signal, and a second terminal of the first capacitor is coupled with a fixed-voltage terminal;

wherein during the load transient period, the signal adjusting circuit turns on the first switch to reduce the difference between the second filtered signal and the first filtered signal.

17. The control circuit of claim 14, wherein the signal adjusting circuit comprises:

a sample-and-hold circuit, coupled with the periodical signal generating circuit and the comparison circuit, configured to operably generate a sample-and-hold signal according to the first filtered signal and the comparison signal;

a detection circuit, coupled with the sample-and-hold circuit and the periodical signal generating circuit, configured to operably generate an adjustment signal according to the second filtered signal and the sample-and-hold signal, and to operably utilize the adjustment signal to control the second filter to reduce the difference between the second filtered signal and the first filtered signal; and
a current adjusting circuit, coupled with the detection circuit and the periodical signal generating circuit;
wherein when the lower switch is turned on, the current adjusting circuit reduces the output current of the periodical signal generating circuit according to the adjustment signal to accelerate a declining rate of the periodical signal.

18. The control circuit of claim 17, wherein the current adjusting circuit comprises:
   a second switch, wherein a first terminal of the second switch is coupled with an output terminal of the periodical signal generating circuit;
   a current sink, coupled with a second terminal of the second switch; and
   a logic unit, coupled with an output terminal of the detection circuit and a control terminal of the second switch;
   wherein when the lower switch is turned on, the logic unit turns on the second switch according to the adjustment signal, so that the current sink draws the output current of the periodical signal generating circuit to accelerate the declining rate of the periodical signal.

19. The control circuit of claim 17, wherein the current adjusting circuit comprises:
   a second switch, wherein a first terminal of the second switch is coupled with an output terminal of the periodical signal generating circuit;
   a current sink, coupled with a second terminal of the second switch;
   a logic unit, coupled with an output terminal of the detection circuit and a control terminal of the second switch; and
   a second transconductance circuit, coupled with a control terminal of the current sink and the periodical signal generating circuit, configured to operably generate a difference signal according to the difference between the first filtered signal and the second filtered signal;
   wherein when the lower switch is turned on, the logic unit turns on the second switch according to the adjustment signal, so that the current sink draws the output current of the periodical signal generating circuit according to the difference signal to accelerate the declining rate of the periodical signal.

20. The control circuit of claim 17, wherein the current adjusting circuit comprises:
   a second transconductance circuit, coupled with the periodical signal generating circuit, configured to operably generate a difference signal according to the difference between the first filtered signal and the second filtered signal;
   a third transconductance circuit, coupled with the periodical signal generating circuit and the second transconductance circuit;
   a third switch, wherein a first terminal of the third switch is coupled with an input terminal of the third transconductance circuit, and a second terminal of the third switch is coupled with a fixed-voltage terminal; and
   a logic unit, coupled with an output terminal of the detection circuit and a control terminal of the third switch;
   wherein when the lower switch is turned on, the logic unit turns off the third switch according to the adjustment signal, so that the third transconductance circuit draws the output current of the periodical signal generating circuit according to the difference signal to accelerate the declining rate of the periodical signal.

21. The control circuit of claim 17, wherein the current adjusting circuit reduces the output current of the periodical signal generating circuit according to the adjustment signal only if the lower switch is turned on while the upper switch is turned off.

22. The control circuit of claim 21, wherein the current adjusting circuit comprises:
   a second switch, wherein a first terminal of the second switch is coupled with an output terminal of the periodical signal generating circuit;
   a current sink, coupled with a second terminal of the second switch;
   a logic unit, coupled with a control terminal of the second switch; and
   a flip flop, coupled between an output terminal of the detection circuit and an input terminal of the logic unit;
   wherein when the upper switch is turned off and the lower switch is turned on, the flip flop controls the logic unit to turn on the second switch according to the adjustment signal, so that the current sink draws the output current of the periodical signal generating circuit to accelerate the declining rate of the periodical signal.

23. The control circuit of claim 21, wherein the current adjusting circuit comprises:
   a second switch, wherein a first terminal of the second switch is coupled with an output terminal of the periodical signal generating circuit;
   a current sink, coupled with a second terminal of the second switch;
   a logic unit, coupled with a control terminal of the second switch;
   a flip flop, coupled between an output terminal of the detection circuit and an input terminal of the logic unit; and
   a second transconductance circuit, coupled with a control terminal of the current sink and the periodical signal generating circuit, configured to operably generate a difference signal according to the difference between the first filtered signal and the second filtered signal;
   wherein when the upper switch is turned off and the lower switch is turned on, the flip flop controls the logic unit to turn on the second switch according to the adjustment signal, so that the current sink draws the output current of the periodical signal generating circuit according to the difference signal to accelerate the declining rate of the periodical signal.

24. The control circuit of claim 21, wherein the current adjusting circuit comprises:
   a second transconductance circuit, coupled with the periodical signal generating circuit, configured to operably generate a difference signal according to the difference between the first filtered signal and the second filtered signal;
   a third transconductance circuit, coupled with the periodical signal generating circuit and the second transconductance circuit;
   a third switch, wherein a first terminal of the third switch is coupled with an input terminal of the third transconductance circuit, and a second terminal of the third switch is coupled with a fixed-voltage terminal;
   a logic unit, coupled with a control terminal of the third switch; and
   a flip flop, coupled between an output terminal of the detection circuit and an input terminal of the logic unit;
   wherein when the upper switch is turned off and the lower switch is turned on, the flip flop controls the logic unit to turn off the third switch according to the adjustment signal, so that the third transconductance circuit draws the output current of the periodical signal generating circuit according to the difference signal to accelerate the declining rate of the periodical signal.

\* \* \* \* \*